United States Patent [19]
Maekawa et al.

[11] Patent Number: 5,634,530
[45] Date of Patent: Jun. 3, 1997

[54] LUBRICATING DEVICE FOR POWER TRANSFER SYSTEM

[75] Inventors: Masatoshi Maekawa, Kosai; Hideki Sado, Zama, both of Japan

[73] Assignees: Nissan Motor Co., Ltd., Yokohama; Fuji Univance Corporation, Kosai, both of Japan

[21] Appl. No.: 531,479

[22] Filed: Sep. 21, 1995

[30] Foreign Application Priority Data

Sep. 21, 1994 [JP] Japan ................................ 6-226615

[51] Int. Cl.$^6$ .................................................. F01M 9/00
[52] U.S. Cl. ...................... 184/6.12; 184/11.2; 184/13.1; 184/61; 74/467
[58] Field of Search ............................. 184/6.12, 11.2, 184/13.1, 61; 74/467

[56] References Cited

U.S. PATENT DOCUMENTS

| | | | |
|---|---|---|---|
| 2,935,889 | 5/1960 | Adams et al. | 184/6.12 |
| 3,065,822 | 11/1962 | McAfee et al. | 184/6.12 |
| 3,618,711 | 11/1971 | Vollmer | 184/11.2 |
| 4,040,309 | 8/1977 | Wood et al. | 184/6.12 |
| 5,411,116 | 5/1995 | Kish et al. | 184/11.2 |
| 5,480,003 | 1/1996 | Hill et al. | 184/11.2 |

FOREIGN PATENT DOCUMENTS

| | | | |
|---|---|---|---|
| 63-137153 | 9/1988 | Japan . | |
| 7-186759 | 7/1995 | Japan . | |
| 1115446 | 5/1968 | United Kingdom | 184/6.12 |

*Primary Examiner*—Thomas E. Denion
*Attorney, Agent, or Firm*—Foley & Lardner

[57] ABSTRACT

A lubricating device lubricates various parts of a power transfer system for a vehicle. The lubricating device comprises a gear interconnected with an output shaft and splashes lubricating oil in an oil chamber. The splashed oil is received by a cover member and supplied to a passage for supplying the lubricating oil to a bushing for rotatably supporting an output shaft of the power transfer system. Therefore, even if the direction to which lubricating oil is splashed by the gear is changed according to an operating condition of the vehicle, the cover member securely receives the splashed oil and supplies it to the passage for the bushing.

9 Claims, 9 Drawing Sheets

LUBRICATING DEVICE FOR POWER TRANSFER SYSTEM

BACKGROUND OF THE INVENTION

1. Field of the Invention

The present invention relates to improvements in a lubricating device for a drive power transfer system of a vehicle, and more particularly to improvements in a structure of a lubricating device.

2. Description of the Related Art

Various transfer systems for distributing a drive power of an engine to front wheels and rear wheels have been disclosed and are in practical use. Each of these system is provided with a lubricating device which lubricates various frictional portions. Japanese Utility Model Provisional Publication No. 63-137153 discloses a power transfer system which includes an oil pump for supplying lubricating oil to a planetary gear set of the power transfer system. The oil pump is driven by a gear integrally rotated with the planetary gear set. Japanese Patent Provisional Publication No. H7-186759 discloses a lubricating device for a power transfer system where an oil pump is operated by receiving a rotational power of an output shaft of the system through a gear integral with the oil pump. The gear is dipped in lubricating oil of a lubricating oil chamber and splashes the lubricating oil by its rotation so as to supply the oil to lubricated parts.

However, in such splash type lubricating device, it is desirable that lubricating oil be further securely and stably supplied to lubricated parts under all conditions.

SUMMARY OF THE INVENTION

It is an object of the present invention to provide an improved lubricating device that securely lubricates various portions of a power transfer system for a variable power distribution type vehicle.

A lubricating device according to the present invention is for a power transfer system of a vehicle. The lubricating device lubricates a bushing at which an output shaft of the power transfer system is rotatably supported. The lubricating device comprises an oil chamber for storing lubricating oil therein. A gear means splashes the lubricating oil in the oil chamber. The splashed oil is supplied to the bushing through an oil passage extending to the bushing and around the output shaft. A splashed lubricating oil guide receives the splashed lubricating oil and supplies it to the oil passage.

With this arranged lubricating device, even if the direction of lubricating oil splashed by the gear is changed according to an operating condition of the vehicle, the cover member securely receives the splashed lubricating oil and supplies it to the passage for the bushing.

DETAILED DESCRIPTION OF THE INVENTION

Referring to drawings, there is shown an embodiment of a lubricating device for a drive power transfer system in accordance with the present invention.

Figure 1:
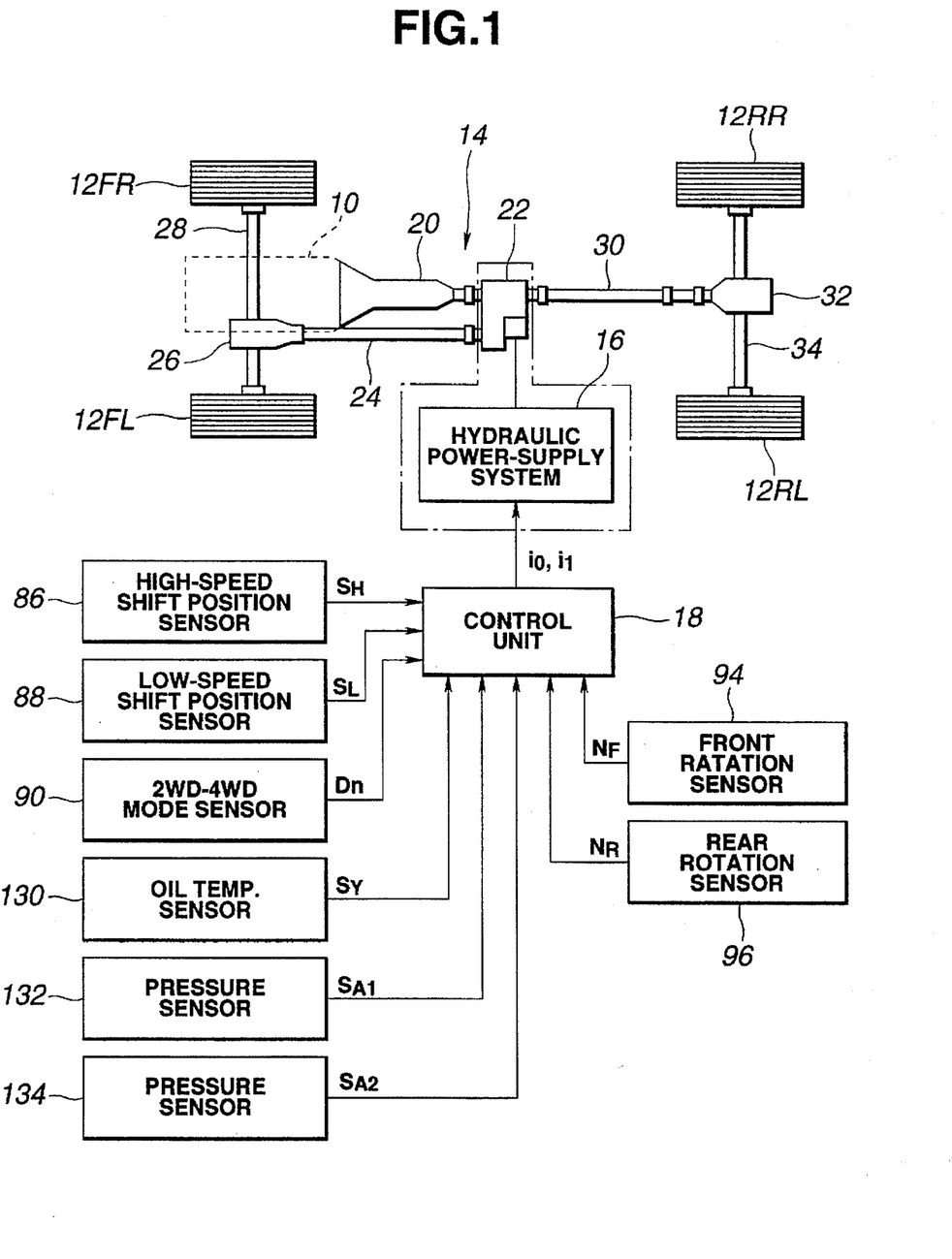
FIG. 1 is a schematic view of a drive power transfer system which is provided with a lubricating device according to the present invention.

FIG. 1 shows a part-time four wheel drive (4WD) vehicle of a front-engine and rear-drive (FR) type. This vehicle comprises an engine 10, a pair of front wheels 12FR and 12FL, a pair of rear wheels 12RR and 12RL, a drive power transfer system 14 that variably changes the distribution ratio of drive power to the front wheels 12FR and 12FL and the rear wheels 12RR and 12RL, a hydraulic power supply system 16 operated to control the distribution ratio of the drive power transfer system 14, and a control unit 18 for controlling the hydraulic power supply system 16.

The drive power transfer system 14 is provided with a transmission 20 where the rotation speed of the drive power from the engine 10 is changed by a selected gear ratio, and a transfer 22 that distributes the drive power from the transmission 20 to the front wheels 12FL and 12FR and the rear wheels 12RR and 12RL. In the drive power transfer system 14, the distributed front drive power is transferred from the transfer 22 to the front wheels 12FR and 12FL through a front wheel output shaft 24, a front differential gear 26 and a front drive axle 28. Further, the distributed rear drive power is transferred from the transfer 22 to the rear wheels 12RR and 12RL through a propeller shaft (rear wheel output shaft) 30, a rear differential gear 32 and a rear drive axle 34.

A sensor group of this system includes a front side rotation sensor 94, a rear side rotation sensor 96, a high-speed shift position sensor 86, a low-speed shift position sensor 88, a 2WD–4WD mode sensor 90, an oil temperature sensor 130, a first pressure sensor 132 and a second pressure sensor 134. The control unit 18 receives the output signals from these sensors and controls the drive power distribution ratio by producing control signals $i_0$ and $i_1$ and sending them to the hydraulic pressure supply system 16.

Figure 2:
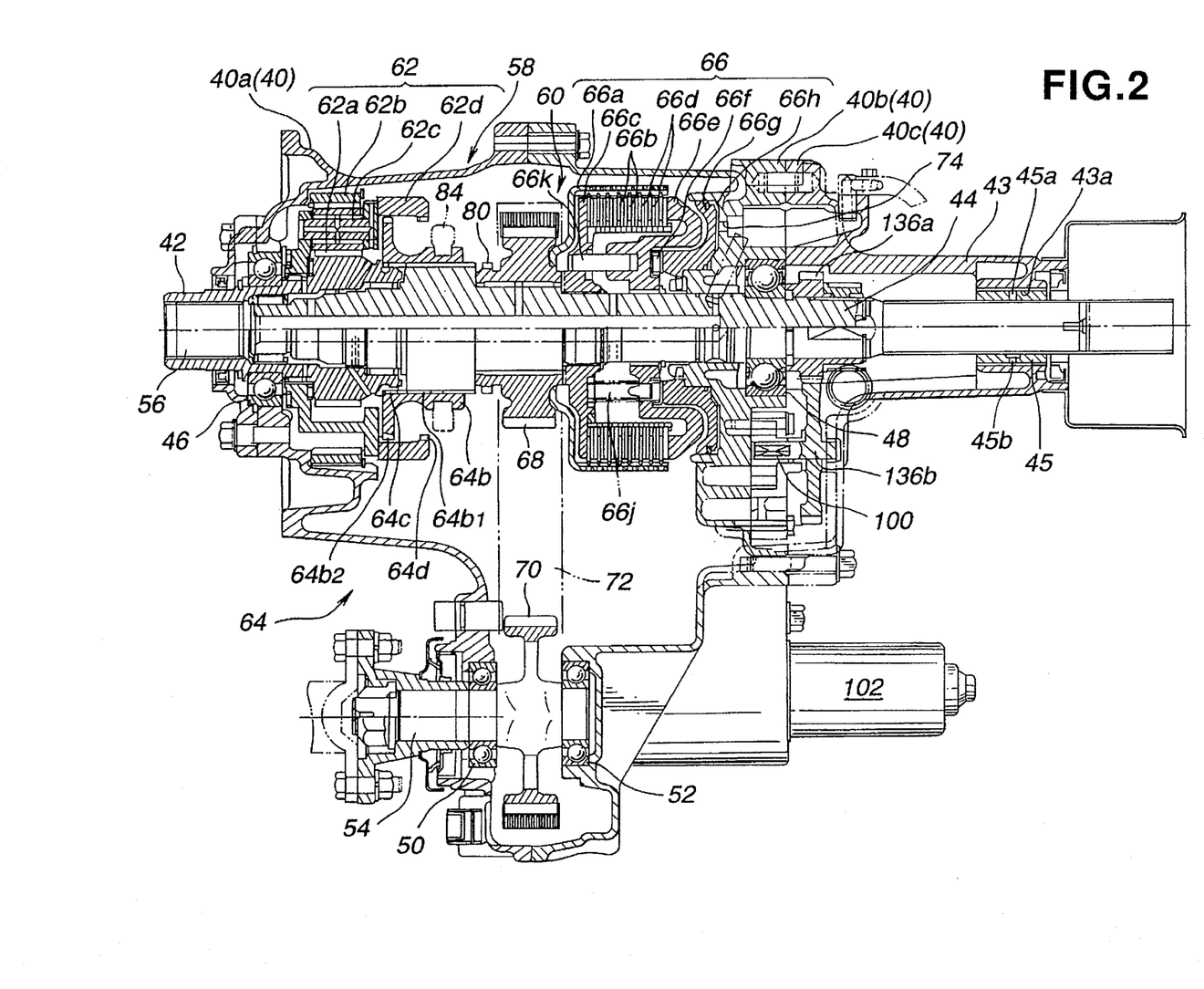
FIG. 2 is a sectional view of a transfer of the drive power transfer system.

FIG. 2 shows an inner structure of the transfer 22 where an input shaft 42 is coaxially connected in but contact with a first output shaft 44 in a transfer casing 40. The transfer casing 40 is constituted by a front casing 40a disposed to a front-wheel side, a rear casing 40c disposed to a rear-wheel side and a center casing 40b disposed between the front and rear casings 40a and 40c. Each of the front, center and rear casings 40a, 40b and 40c has a flange through which each casing 40a, 40b or 40c is fixedly and integrally connected with other flanges by means of bolts. The input shaft 42 is rotatably supported to the front casing 40a of the transfer casing 40 through a radial bearing 46. The first output shaft 44 is rotatably supported to the center casing 40b of the transfer casing 40 through a radial bearing 48. As better shown in FIG. 3, the radial bearing (ball bearing) 48 is constituted by an inner race 48a engaged with the first output shaft 44, an outer race 48b engaged with an inner wall of the center casing 40b and a plurality of ball bearings 48c disposed between the inner and outer races 48a and 48b. The input shaft 42 and the first output shaft 44 are rotatably arranged in tandem. A second output shaft 54 is rotatably supported to the front and center casing 40a and 40b through bearings 50 and 52, and is parallel with the input shaft 42 and the first output shaft 44. The input shaft 42 is connected with an output shaft 56 of the transmission 20. The first output shaft 44 is connected with the rear wheel output shaft 30. The second output shaft 54 is connected with the front wheel output shaft 24.

Figure 3:
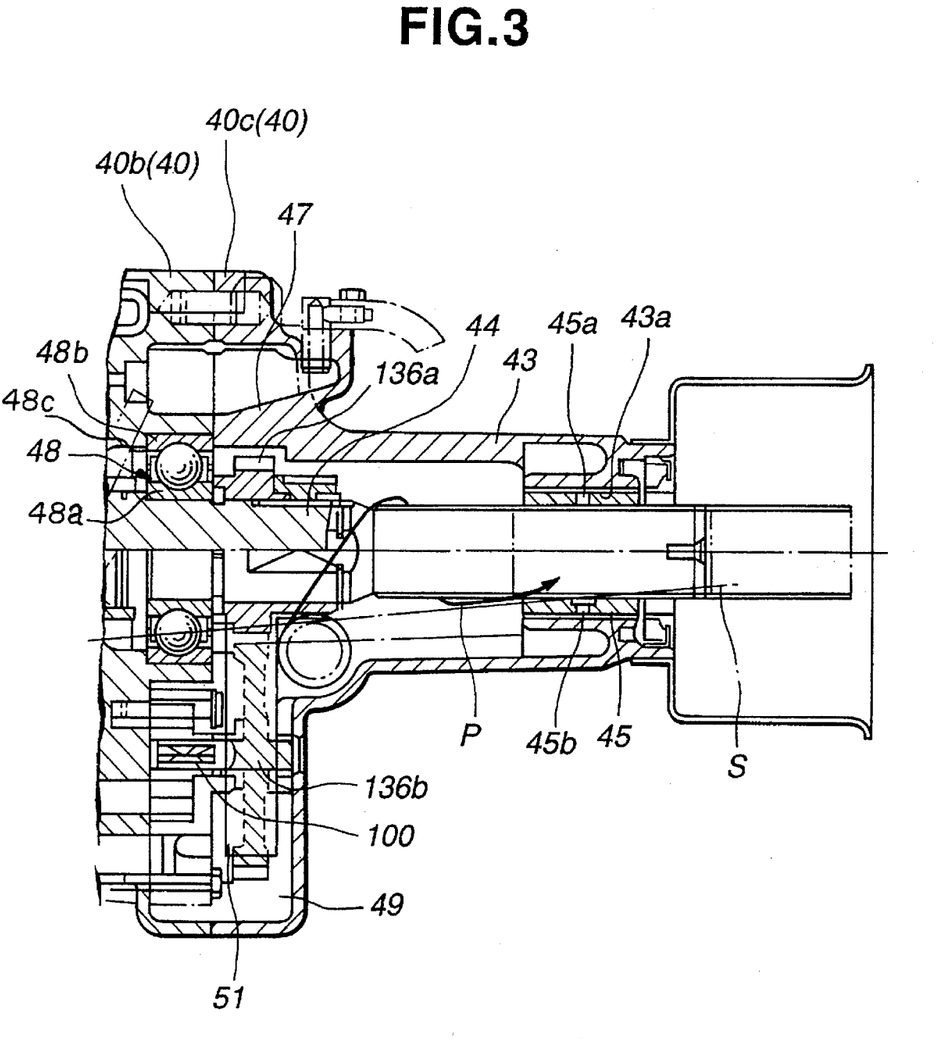
FIG. 3 is an enlarged partial view of the transfer of FIG. 2.
Figure 4:
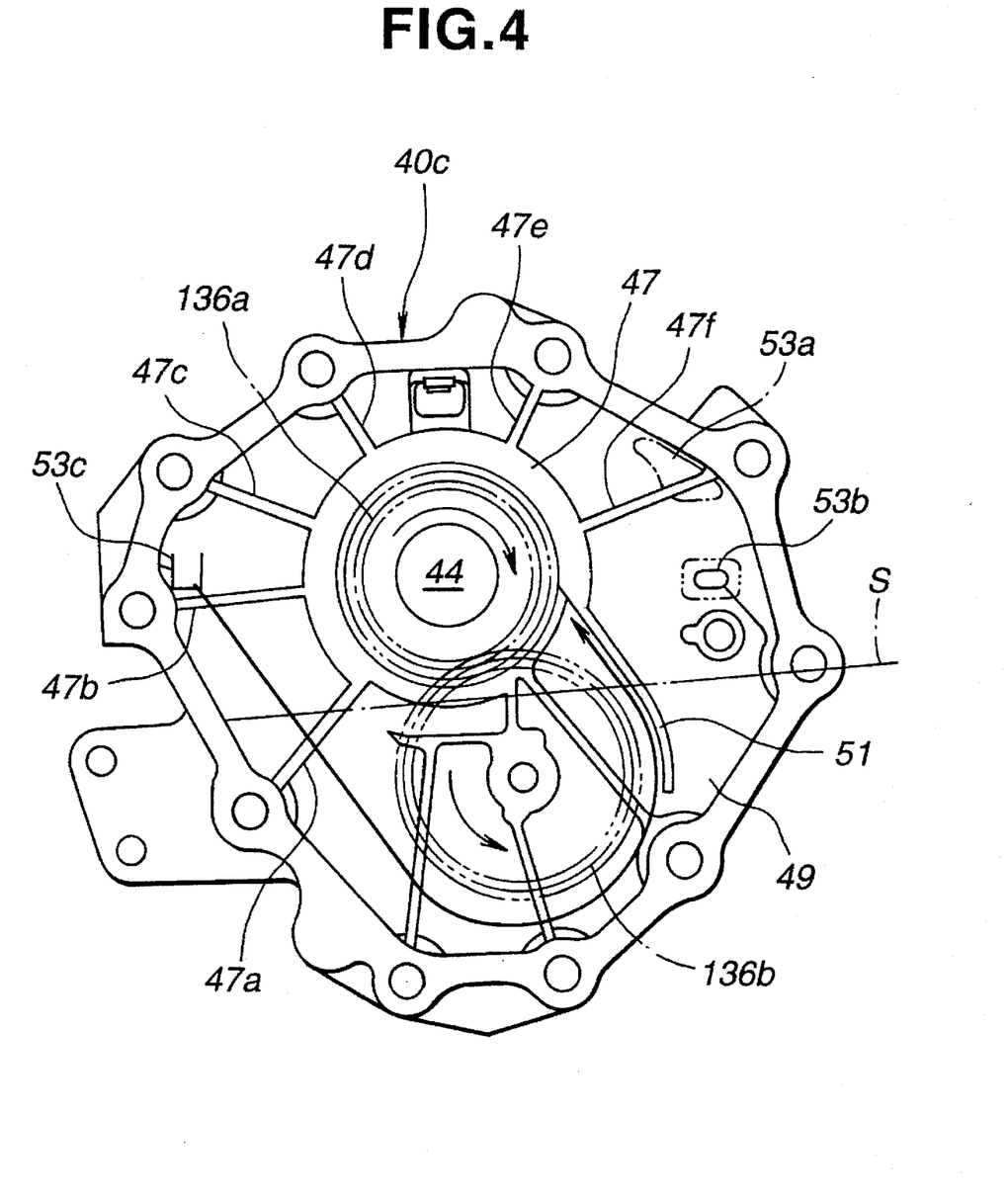
FIG. 4 is a side view of a rear casing of the transfer of FIG. 2.

As shown in FIGS. 3 and 4, the rear casing 40c is formed so as to protrude toward a right hand direction as viewed FIG. 3. An end portion of the first output shaft 44 is rotatably supported by a bushing 45 installed at an inner diameter portion 43a of a protruding portion 43 of the rear casing 40c. The bushing 45 is provided with an outer periphery that is splined with the inner diameter portion 43a of the rear casing 40c and an inner portion that supports the first output shaft 44. The bushing 45 is further provided with a first oil hole 45a and a second oil hole 45b through which lubricating oil is supplied to a rotating surface of the first output shaft 44. The rear casing 40c is further provided with a cylindrical receiving member 47 that extends axially and is in contact with the outer race 48b of the radial bearing 48, and a plurality of reinforcement ribs 47a, 47b, 47c 47d, 47e and 47f, which radially extend from the outer periphery of the cylindrical receiving member 47. The rear casing 40c and the center casing 40b defines a lubricating oil chamber 49. The cylindrical receiving member 47 functions as a lubricating oil passage for supplying lubricating oil from the lubricating oil chamber 49 to the bushing 45. A first gear 136a is integrally connected with the first output shaft 44 and is engaged with a second gear 136b that is part of a main pump 100. The second gear 136b is disposed in the lubricating oil chamber 49. An oil cover member 51 is integrally formed with the inner wall of the rear casing 40c. The oil cover member 51 extends toward the cylindrical receiving member 47 while surrounding an upper portion of the outer periphery of the second gear 136b as shown in FIG. 4. The oil cover member 51 receives splashed oil and securely feeds it to the cylindrical receiving member 47 so that the bushing is always lubricated by the lubricating oil from the cylindrical receiving member 47 during the operation of the power transfer system. That is, the oil chamber 49, the second gear 136b, the cylindrical receiving member 47 and the oil cover member 51 constitute a lubricating device for the bushing 45.

A dashed line designated by a reference character S in FIGS. 3 and 4, shows an oil level of the lubricating oil in the lubricating oil chamber 49. The oil level shown by the dashed line in FIG. 3 corresponds to the horizontal line. That, is, the transfer 22 is obliquely installed to the vehicle such that the center axis of the transfer 22 is lowered in height level toward the rearward direction of the vehicle. Oil-drain ports 53a and 53b are formed at the wall of the rear casing 40c and in the vicinity of the rib 47f. The oil-drain ports 53a and 53b receives the lubricating oil splashed to the upper portion of the rear casing 40c and returns it to the lubricating oil chamber 49. The lubricating oil directed to the oil-drain ports 53a and 53b is returned to the lubricating oil chamber 49 through an oil gutter 53c formed in the vicinity of the rib 47b.

As shown in FIG. 2, an auxiliary shift mechanism 58 and a 2WD–4WD selector mechanism 60 are installed to the input shaft 42 and the first output shaft 44, respectively. The auxiliary shift mechanism 58 is constituted by a planetary gear mechanism 62 and a high-low speed selector mechanism 64. The high-low speed selector mechanism 64 is of an engage clutch type and is coaxially arranged with the planetary gear mechanism 62. The planetary gear mechanism 62 is constituted by a sun gear 62a formed at an outer periphery of the input shaft 42, an internal gear 62b fixed at an inner portion of the front casing 40a, a pinion gear 62c engaged with the sun gear 62a and the internal gear 62b, and a pinion carrier 62d rotatably supporting the pinion gear 62c.

The high-low speed selector mechanism 64 is constituted by a shift sleeve 64b, a high-speed shifting gear 64c and a low-speed shifting gear 64d. The shift sleeve 64b is provided with inner teeth 64b1 and outer teeth 64b2. The inner teeth 64b1 are splined with a plurality of key grooves of the first output shaft 44. The outer teeth 64b2 are engageable with the low-speed shifting gear 64d formed at an inner periphery of the pinion carrier 62d. The high-speed shifting gear 64c is disposed at an outer periphery of the input shaft 42 and is engageable with the inner teeth 64b1. The low-speed shifting gear 64d is disposed at an inner periphery of the pinion carrier 62d and is engageable with the outer teeth 64b2 of the shift sleeve 64b.

Figure 5:
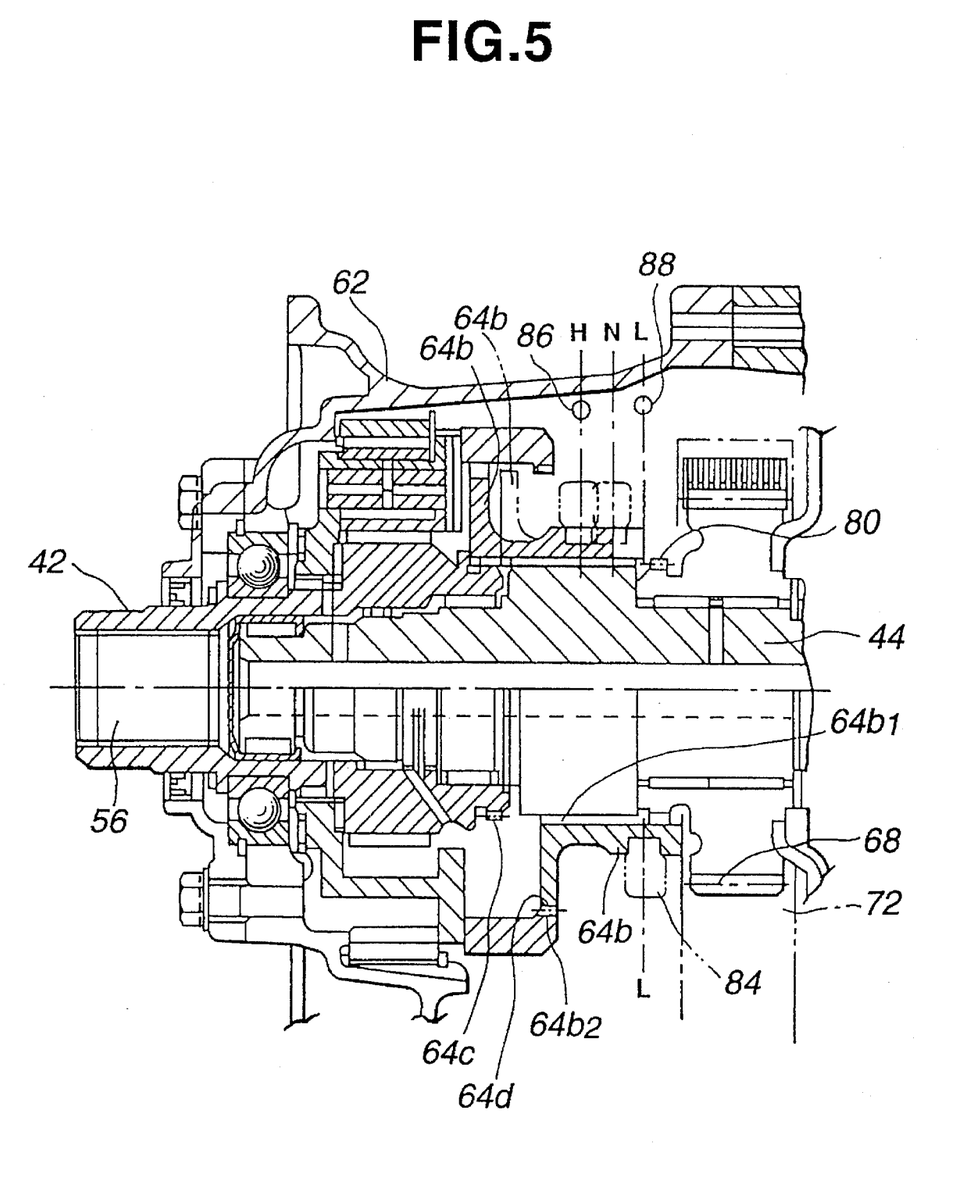
FIG. 5 is another enlarged partial view of the transfer of FIG. 2.

When the shift sleeve 64b is slid to a high-speed shift position designated by a reference character H as shown at an upper half portion in FIG. 5 by a continuous line, the high-speed shift gear 64c is engaged with the inner teeth 64b1. When the shift sleeve 64b is slid to a low-speed shift position designated by a reference character L as shown at a lower half portion in FIG. 5, the low-speed shift gear 64d is engaged with the outer teeth 64b2. Further, when the shift sleeve 64b is slid to a neutral position designated by a reference character N as shown at the upper half portion in FIG. 5 by a two-dots chain line, both of the inner teeth 64b1 and the outer teeth 64b2 are free from the high-low selector mechanism 64.

The 2WD–4WD selector mechanism 60 is constituted by a wet and multi-disc type friction clutch 66 for changing a distribution ratio of driver power to the front and rear wheels, a first sprocket 68 rotatably connected with the first output shaft 44, a second sprocket 70 axially connected to the second output shaft 54, and a chain interconnecting the first and second sprockets 68 and 70.

The friction clutch 66 is constituted by a clutch drum 66a, a friction plates 66b, a clutch hub 66c, a friction discs 66d, a rotation member 66e, a pin 66k, a thrust bearing 66f, a cylinder chamber 66h, and a return spring 66j. The clutch drum 66a is connected with the first sprocket 68 and is splined with the friction plates 66b. The clutch hub 66c is splined with the first output shaft 44. The friction discs 66d are integrally connected with the clutch hub 66c and are alternately disposed between the friction plates 66b. The rotation member 66e is disposed at an outer periphery of the first output shaft 44 and functions to connect the friction plates 66b and the friction discs 66d by its axial movement toward the clutch drum 66a. The pin 66k is integrally connected with the clutch hub 66c and interconnects the rotation member 66e with the clutch hub 66c. The clutch piston 66g is installed at an inner wall of the center casing 40b so as to be axially movable. The thrust bearing 66f transfers the axial movement of the clutch piston 66g to the rotation member 66e. The cylinder chamber 66h is formed between the clutch piston 66g and the inner wall of the center casing 40b. The return spring 66j applies a biasing force directing toward the clutch piston 66g to the rotation member 66e.

An input port 74 is formed at the center casing 40b so that a hydraulic pressure is supplied to the cylinder chamber 66h. When a clutch pressure Pc is supplied from the hydraulic power supply system 16 to the cylinder chamber 66h, the clutch piston 66g is moved in the left hand side in FIG. 2 due to the pushing force generated in the cylinder chamber 66h. By this movement of the clutch piston 66g, the friction plates 66b and the friction discs 66d are in contact with each other and generate an engagement force according to the clutch pressure Pc. Accordingly, a distribution ratio of the drive power is determined in correspond to the engagement force of the friction clutch 66, and a part of the rotational drive power of the first output shaft 44 is transferred to the second output shaft 54 through the first sprocket 68, an endless chain 72 and the second sprocket 70 according to the determined engagement force.

When the clutch pressure Pc is lowered and therefore the rotation member 66e and the clutch piston 66g are moved due to the biasing force of the return spring 66j in the right hand direction of FIG. 2, the friction plates 66b and the friction discs 66d are disengaged. Accordingly, the rotational drive power of the first output shaft 44 is not transferred to the second output shaft 54.

The first sprocket 68 is provided with a 4WD operation gear 80 at an outer periphery of a left hand side in FIG. 2 of the first sprocket 68. When the shift sleeve 64b is slid to the low-speed position L of FIG. 5, the outer teeth 64b2 is engaged with the low-speed shift gear 64d, and simultaneously the 4WD operation gear 80 is engaged with the inner teeth 64b1. By this engagement, the shift sleeve 64b and the 4WD operation gear 80 achieve a dog-clutch engagement between the first and second output shaft 44 and 54 so that the drive force of the first output shaft 44 is directly transferred to the second output shaft 54.

Practically, the shift sleeve 64b of the high-low speed selector mechanism 64 of a dog-clutch type is manually slid from the high-speed position H, neutral position N, or low-speed position L through a fork 84 by a manual operation of the auxiliary transfer lever (not shown).

The high-speed shift position sensor 86 detects that the shift sleeve 64b is slid to the high-speed shift position H, and the low-speed shift position sensor 88 detects that the shift sleeve 64b is slid to the low-speed shift position L in the front casing 40a. The high-speed shift position sensor 86 outputs a signal SH indicative that the shift sleeve 64b is set at the high-speed shift position H to a control unit 18. Similarly, the low-speed shift position sensor 88 outputs a signal SL indicative that the shift sleeve 64b is set at the low-speed shift position L to the control unit 18. The front and rear side rotation sensors 94 and 96 are associated with the front and rear drive shafts 24 and 30, respectively. Each of the front and rear side rotation sensors 94 and 96 optically or electomagnetically senses the number of the revolutions of the associated drive shaft 24 or 30 per unit time, and produces a pulse signal or sinusoidal signal indicative of a front or rear wheel speed NF or NR. In determining a wheel speed from a wheel rpm, a tire diameter is involved as a parameter, and accordingly the determined wheel speed can deviate from the actual wheel speed when the diameter of an actual tire is different from the initially set tire diameter.

Figure 6:
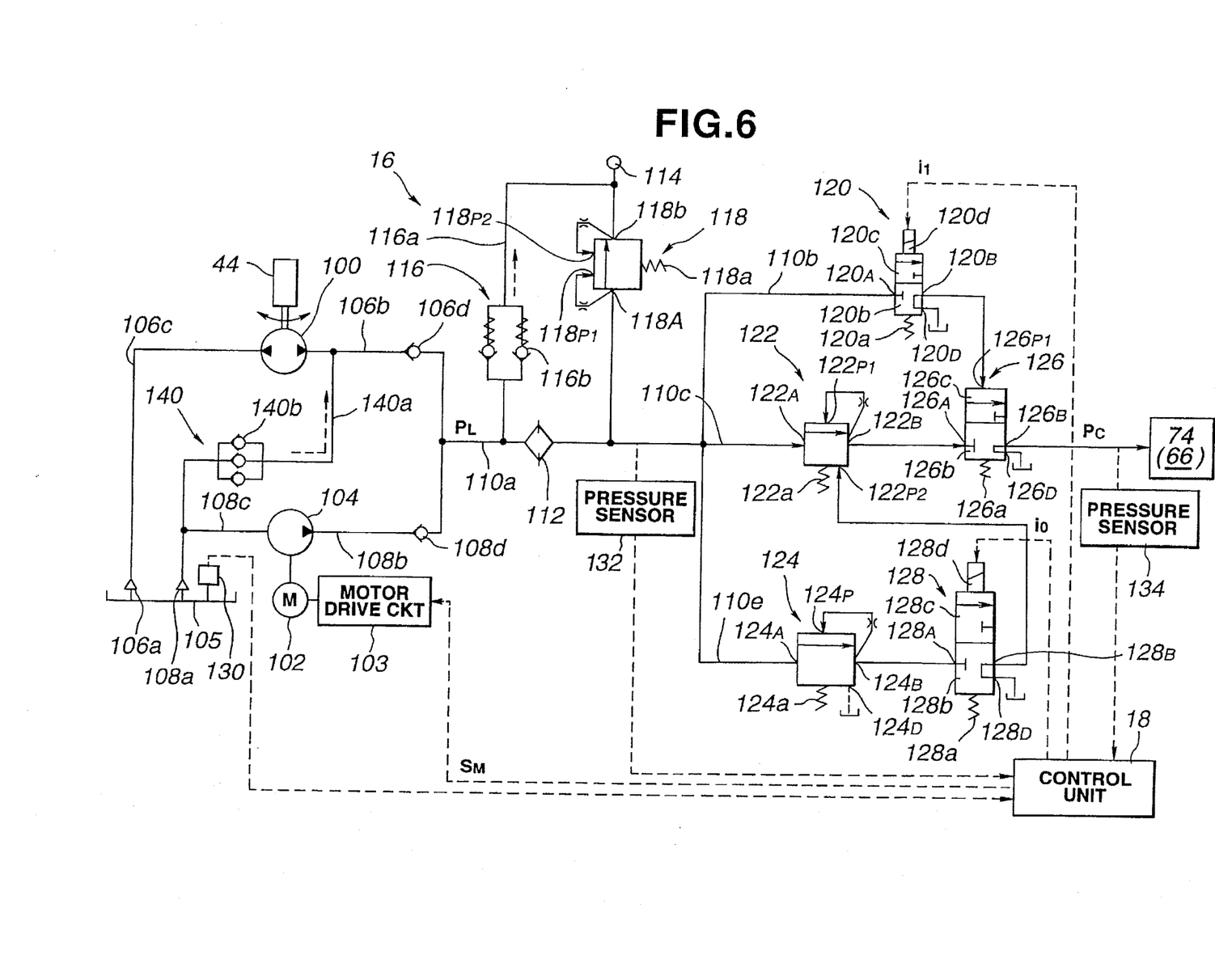
FIG. 6 is a hydraulic circuit diagram of a hydraulic control system for the drive power transfer system.

The hydraulic power supply system 16 is arranged to supply the predetermined clutch pressure Pc to the input port 74 of the transfer 22 as shown in FIG. 6. The hydraulic power supply system 16 is provided with the main pump 100 of a reversible rotation type directly connected with the first output shaft 44 and an auxiliary pump 104 arranged parallel with the main pump 100 and driven by an auxiliary motor 102 of an electric motor, as a hydraulic power source.

The main and auxiliary pumps 100 and 104 draw the operation oil in an oil tank 105 through strainers 106a and 108a and discharge it to conduits 106b and 108b. The conduits 106b and 108b are connected to a combined conduit 110a to which an oil element 112 is connected. A relief passage 116 is connected to the combined conduit 110a at an upstream side of the oil element 112. A line pressure control valve 118 is connected to the combined conduit 110a at a downstream side of the oil element 112. Conduits 110b, 110c and 110e are branched from the combined conduit 110a and are connected to an electromagnetic valve 120, a clutch pressure control valve 122 and a pressure regulator valve 124, respectively. An output of the clutch pressure control valve 122 is connected to an input of a pilot pressure selector valve 126 that supplies the clutch pressure Pc to the transfer 22 when the pilot pressure selector valve 126 receives a pilot pressure from the electromagnetic selector valve 120. An output of the pressure regulator valve 124 is connected to an input of a duty control electromagnetic valve 128. An oil temperature sensor 130 is installed in an oil tank 105 to detect the temperature of the operation oil. A first oil pressure sensor 132 is installed in the combined conduit 110a between the line pressure control valve 118 and the branch portion of the conduits 110b, 110c and 110e to detect a controlled pressure by the line pressure control valve 118. A second oil pressure sensor 134 is installed between the pilot selector valve 126 and the input port 74 to detect the clutch pressure Pc output from the pilot selector valve 126. The first and second oil pressure sensors 132 and 134 output a signal SA1 indicative that a controlled pressure is detected and a signal SA2 indicative that the clutch pressure Pc is detected, respectively to the control unit 18. This hydraulic power supply system 16 is installed in the transfer 22. As shown in FIG. 2, the main pump 100 is interconnected to the first output shaft 44, and the auxiliary pump 104 is interconnected to the electric motor 102 attached to the center casing 40b.

Next, with reference to FIG. 6, the parts of the hydraulic power supply system 16 will be discussed in detail.

The main pump 100 draws the operation oil from the oil tank 105 through the strainer 106a connected to an end of an intake conduit 106c. The auxiliary pump 104 draws the operation oil from the oil tank 105 through the strainer 108a connected to an end of an intake conduit 108c. The discharge conduit 106b connects the main pump 100 and the combined conduit 110a. A one-way value 106d is installed in the discharge conduit 106b, and a bypass passage 140 is connected to the discharge conduit 106b between the main pump 100 and the one-way valve 106d. The discharge conduit 108b connects the auxiliary pump 104 and the combined conduit 110a. A one-way valve 108d is installed in the discharge conduit 108b. The bypass passage 140 is constituted by a bypass conduit 140a and a triple one-way valve 140b installed in the bypass conduit 140a. When the first discharge conduit 106b is put in a negative pressure condition, the triple one-way valve 140b is opened to flow the operation oil in the direction designated by a broken-line arrow in FIG. 6.

A relief passage 116 is constituted by a relief conduit 116a whose one end is connected to a lubricating system 114 and a twin one-way valve 116b with spring installed in the relief conduit 116a. When the pressure at an upstream side of the oil element 112 becomes larger than a predetermined value due to the blinding of a filter of the oil element 112, the twin one-way valve 116b is opened to flow the operation oil in the direction designated by a broken-line arrow.

The line pressure control valve 118 is a pressure reducing valve of an internal pilot operating type with spring. The line pressure control valve 118 is provided with a cylinder valve housing which includes an input port 118A connected to the combined conduit 110a, an output port 118b connected to the lubricating system 114 and a primary internal pilot port 118P1 for supplying a primary pressure through a fixed orifice and a secondary internal pilot port 118P2 for supplying a secondary pressure through a fixed orifice. A spool is slidably disposed in the cylindrical valve housing and is biased by a return spring 118a. A supply pressure PL pressurized by the main pump 100 or auxiliary pump 104 is regulated at a predetermined pressure value by the line pressure control valve 118 and supplies to the electromagnetic selector valve 120, the clutch pressure control valve 122 and the pressure reducing valve 124. The operation oil flowed out from the output port 118b during the reduced pressure setting is returned to the lubricating system 114.

The clutch pressure control valve 122 is a pressure control valve of an internal and external pilot operating type and a spring type. The clutch pressure control valve 122 is provided with a cylindrical valve housing which includes an input port 122A connected to the conduit 110c, an output port 122B connected to the pilot selector valve 126, an internal pilot port 122P1 for supplying a secondary pressure through a fixed orifice as a pilot pressure and an external pilot port 122P2 for supplying a control pressure from the duty ratio control electromagnetic valve 128. A spool is slidably disposed in the cylindrical valve housing and is biased by a return spring 122a. When the duty control valve 128 does not supply a pilot control pressure, a communication passage between the input port 122A and the output port 122B is closed and therefore the clutch pressure control valve 122 does not output a secondary pressure. On the other hand, when the pilot control pressure is supplied from the duty control valve 128, the spool is moved to output the secondary pressure from the output port 122B as a clutch pressure Pc according to the pilot control pressure.

The pressure reducing valve 124 is of a secondary pressure keeping type and an internal pilot operating and spring operating type. The pressure reducing valve 124 is provided with a cylindrical valve housing which includes an input port 124A connected to a conduit 110e, an output port 124B connected to the duty control electromagnetic valve 128, an internal pilot port for supplying a secondary pressure from the output port 124B through a fixed orifice as a pilot pressure, and a drain port 124D. A spool is slidably disposed in the cylindrical valve housing and biased by a return spring 124a. When the spool is slid to a predetermined position by the pilot pressure from the internal pilot port 124P, a primary pressure from the input port 124A is lowered at a predetermined value and is supplied to the duty control electromagnetic valve 128 as a control pressure.

The duty control electromagnetic valve 128 is a 3-port and 2-position type and is provided with a cylindrical valve housing which includes an input port 128A connected to the pressure reducing valve 124, a drain port 128D connected to a drain side, an output port 128B connected to an external pilot port 122P2 of the clutch pressure control valve 122. A spool is slidably disposed in the valve housing and is biased by a return spring 128a. The spool takes a normal position 128b where the output port 128B and the drain port 128D are communicated, and an operating position 128c where the input port 128A and the output port 128B are communicated. When an exiting current $i_0$ corresponding to a desired duty ratio is supplied from the control unit 18 to the solenoid 128d, during on-time periods of the exciting current $i_0$, the spool is moved from the normal position 128b to the operating position 128c against the biasing force of the return spring 128a so that a pilot control pressure corresponding to the duty ratio is outputted to the clutch pressure control valve 122. Therefore, when the pilot control pressure is supplied from the duty control electromagnetic valve 128 to the external pilot port 122P2, the clutch pressure Pc corresponding to the pilot control pressure is supplied to the input port 74 of the transfer 22, so that the engagement power of the friction clutch 66 is controlled according to the clutch pressure Pc to distribute the corresponding drive power to the front wheels 12FR and 12FL.

The electromagnetic selector valve 120 is of a spring offset type and of a 3-port and 2-position type. The electromagnetic selector valve 120 is provided with a valve housing which includes an input port 120A for supplying the line pressure, an output port 120B connected to the external pilot port 126P1 of the pilot selector valve 126, and a drain valve 120D. A spool in the valve housing takes a normal position 120b where the input port 120A is closed and the output port 120B and the drain port 120D are communicated, and an operating position 120c where the input port 120A and the output port 120B are communicated and the drain port 120D is closed. When the solenoid 120d of the electromagnetic selector valve 120 receives an exciting current $i_1$ from the control unit 18, the electromagnetic selector valve (on-off valve) 120 is set in the operating position so that the pilot control pressure is supplied to the external pilot port 126P1 of the pilot selector valve 126. When the control unit 18 stops to supply the exciting current $i_1$ to the solenoid 120d, the spool is returned to the normal position 120b by the biasing force of the return spring 120a so that the pilot control pressure is drained to the drain port 120D.

Figure 7:
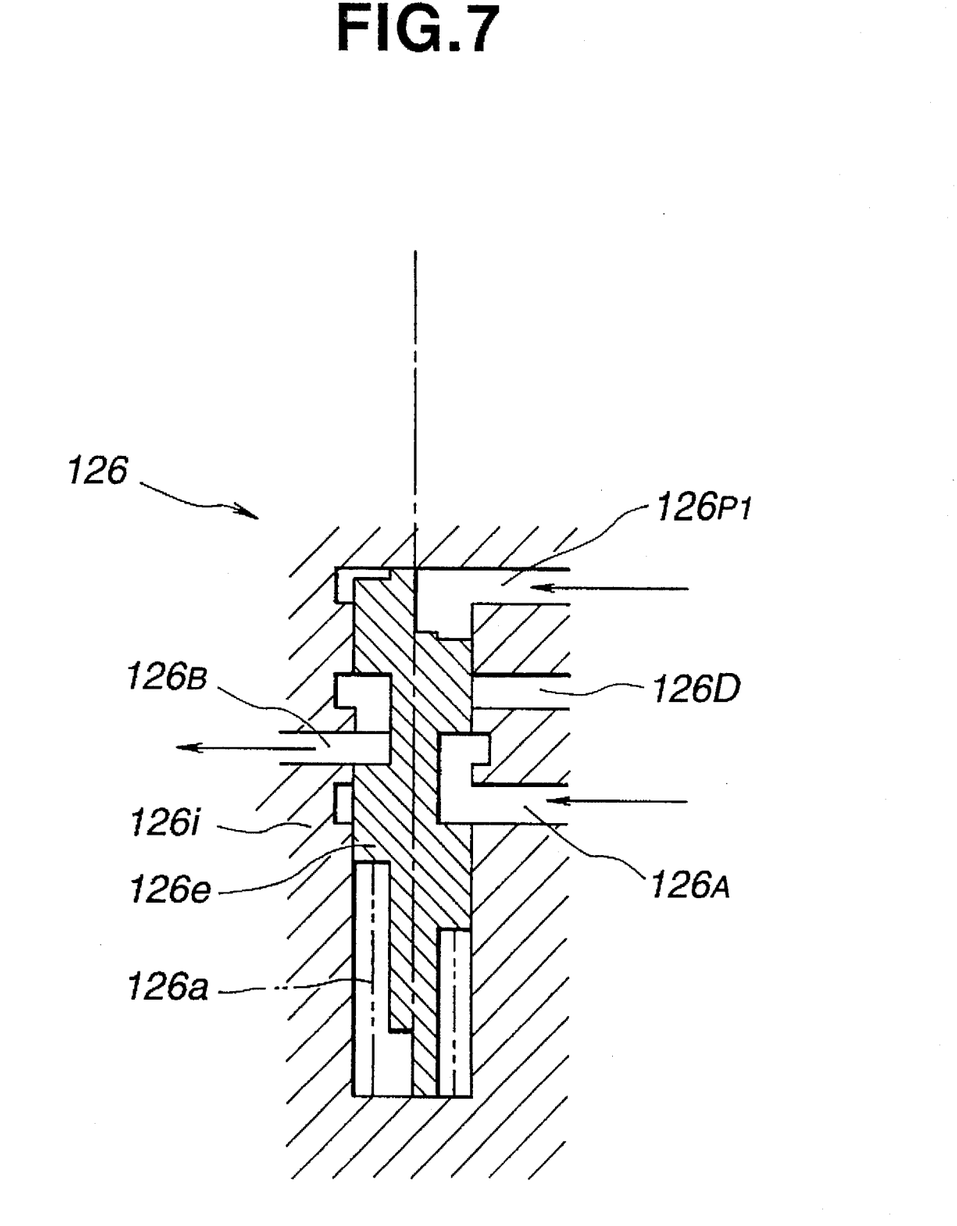
FIG. 7 is a sectional view of a selector valve applied to the hydraulic control system.

The pilot selector valve 126, as shown in FIG. 7, is provided with a cylindrical valve housing 126i, which includes an input port 126A for receiving the secondary pressure from the clutch pressure control valve 122, an output port 126B for supplying the secondary pressure to the transfer 22, an external pilot port 126P1 receiving a control pressure when a solenoid 120d of the electromagnetic selector valve 120 is turned on, and a drain port 126D. A spool 126e is slidably disposed in the valve housing 126i and is biased to one end by a return spring 126a.

When the pilot pressure is not supplied to the external pilot port 126P1, the spool 126e is set at a 2WD mode position where the output port 126B is not communicated with the input port 126A and is communicated with the drain port 126D, as shown by a left hand side spool condition in FIG. 7. When the solenoid 120d of the electromagnetic selector valve 120 is turned on, the electromagnetic selector valve supplies the control pressure to the external pilot port 126P1. This sets the pilot selector valve 126 in a 4WD mode position 126c so as to communicate the input port 126A and the output port 126B as shown by a right hand side spool condition in FIG. 7.

Thus, since the pilot selector valve 126 is driven so that the spool 126e is moved by the pilot control pressure of high pressure from the electromagnetic selector valve 120, the spool 126e is securely operated even if some dusts prevent the movement of the spool 126e.

Figure 8:
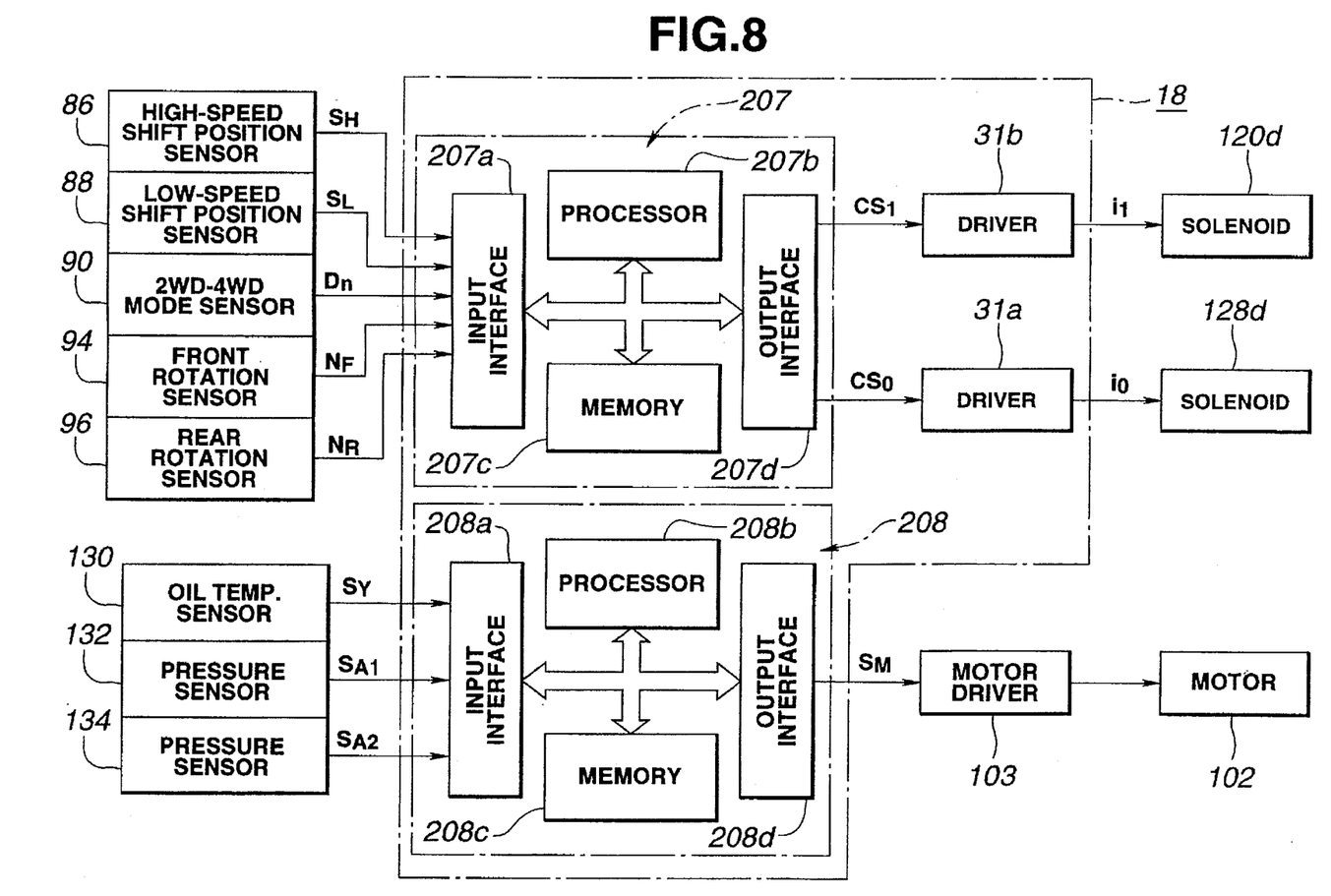
FIG. 8 is a block diagram showing a control unit of the drive power transfer system.

The control unit 18 is arranged to output the exciting currents $i_0$ and $i_1$ to the hydraulic power supply system 16 according to the detection signals from the high-speed shift position sensor 86, the low-speed shift position sensor 88, the 2WD–4WD mode sensor 90, the front side rotation sensor 94 and the rear side rotation sensor 96. The control unit 18 also controls so that the hydraulic power supply system 16 can keep a predetermined hydraulic pressure. More particularly, the control unit 18 receives the detection signals from the oil temperature sensor 130 and the oil pressure sensors 132 and 134 installed in the hydraulic power supply system 16, and outputs a control signal to the hydraulic power supply system 16.

As shown in FIG. 8, the control unit 18 comprises a first microcomputer 207 for executing a drive power distributing control and a second microcomputer 208 for executing a hydraulic pressure keeping control. The first microcomputer 207 outputs the control signal CS0 to a driver 31a which supplies the exciting current $i_0$ corresponding to the desired duty ratio to the duty control electromagnetic valve 128 according to the control signal CS0. The first microcomputer 207 outputs a control signal CS1 to a driver 31b which supplies the exciting current $i_1$ to the solenoid 120d of the electromagnetic selector valve 120 according to the control signal CS1. The second microcomputer 208 outputs a motor control signal SM to a motor driver 103 which controls the rotation speed of the auxiliary motor 102 by the chopper control according to the motor control signal $S_M$.

The first microcomputer 207 comprises an input interface circuit 207a, a processor 207b, a memory 207c and an output interface circuit 207d which are electrically connected with each other. The input interface circuit 207a receives the detected signals $S_H$, $S_L$, Dn, NF and NR from the high-speed shift position sensor 86, the low-speed shift position sensor 88, the 2WD-4WD mode sensor 90, the front rotation sensor 94 and the rear rotation 96, then converts the detected signals to the corresponding digital signals by its A/D converting function. The processor 207b executes calculation and control processing of the drive power distributing control according to a predetermined programmed routine and the obtained data. The memory 207c is constituted by ROM and RAM. The output interface circuit 207d outputs the control signal CS0 for commanding the duty ratio D indicative of the clutch pressure Pc obtained in the processor 207b to the driver 31a. Further, the output interface circuit 207d outputs the control signal CS1 indicative whether the clutch pressure Pc is outputted or not is supplied to the driver 31b.

The second microcomputer 208 comprises an input interface circuit 208a, a processor 208b, a memory 208c and an output interface circuit 208d electrically connected with each other. The input interface circuit 208a receives the detected signals $S_Y$, $S_{A1}$ and $S_{A2}$ from the oil temperature sensor 130, the oil pressure sensor 132 and the oil pressure sensor 134, and converts the detected signals to the corresponding digital signals. The output interface circuit 208d outputs a command value for commanding the rotation speed of the auxiliary motor 102, such as an analog voltage signal $S_M$ to the motor driver 103.

The first microcomputer 207 determines a command value $T_2$ indicative of the power distribution to the front wheels according to the mode signal Dn from the 2WD-4WD mode sensor 90, the detected signal $S_H$ from the high-speed shift position sensor 86, and the detected signal $S_L$ from the low speed shift position sensor 88, and calculates the duty ratio D for generating the clutch pressure $P_C$ corresponding to the command value $T_2$. The first microcomputer 207 also determines a front and rear wheel speed difference ΔN from the sensed front and rear wheel speeds NF and NR. Further, the first microcomputer 207 outputs the control signal $CS_0$ corresponding to the duty ratio D to the driver 31a. Simultaneously, the microcomputer 207 outputs a control signal CS1 to the driver 31b upon controlling the signal into on-state or off-state. The driver 31a is provided with a pulse-width modulating circuit that modulates the received control signal CS0 to the exciting current $i_0$ corresponding to the duty ratio D. The driver 31a outputs the modulated exciting current $i_0$ to the solenoid 128d of the duty control valve 128. The driver 31b converts the control signal $CS_1$ into the exciting current $i_1$ by which the solenoid 120d of the electromagnetic selector valve 120 is excited, and outputs the converted exciting current $i_1$ to the solenoid 120d.

In this embodiment, the calculating processing is executed by the control unit 18. That is, the control for keeping the oil pressure at a predetermined value in the hydraulic power supply apparatus is executed such that when the oil pressure sensor 132 detects that the line pressure $P_L$ at the combined conduit 110a downstream of the oil element 112 is lower than the preset value, the control unit 18 controls the discharge pressure from the auxiliary pump 104. More particularly, by calculating the control signal $S_M$ indicative of the command value of the rotation speed set according to the detected oil temperature $S_Y$ and by supplying the signal $S_M$ to the motor driver 103, the rotation speed of the auxiliary motor 102 is controlled to keep the line pressure $P_L$ at a predetermined value.

Figure 9:
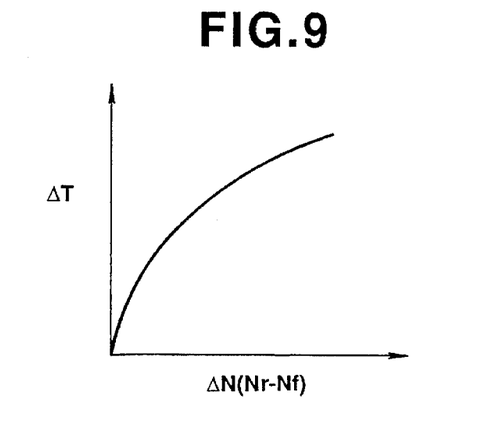
FIG. 9 is a graph showing the relationship between a front and rear speed difference and a distributed front drive power.
Figure 10:
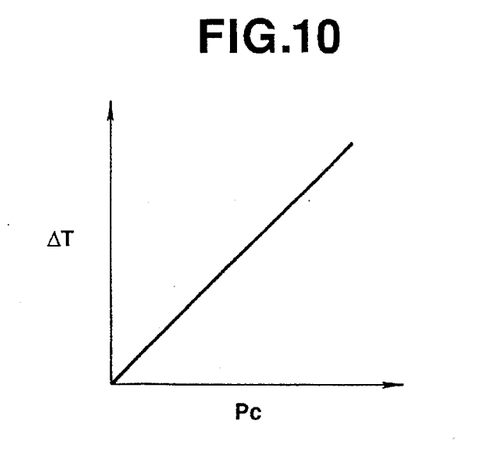
FIG. 10 is a graph showing the relationship between a clutch pressure and the drive torque.
Figure 11:
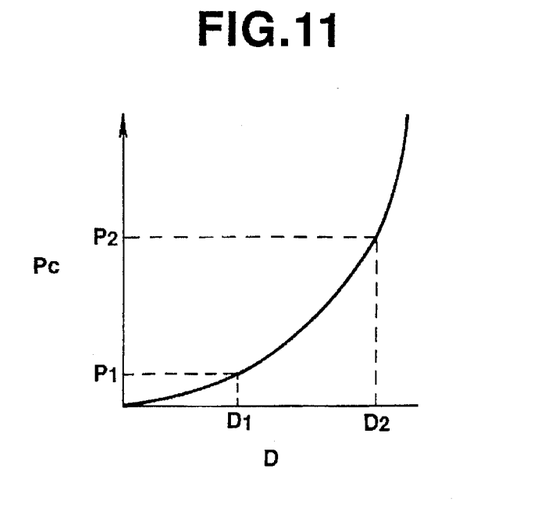
FIG. 11 is a graph showing the relationship between a duty ratio and the clutch pressure.

The memory 207c previously stores programs and data necessary for the processing at the processor 207b and temporally stores the result of the processing. The data stored in the memory 207c includes tables representative of the relationships as shown in FIGS. 9 to 11. FIG. 9 shows a relationship between the rotation speed difference ΔN=(NR−NF) and the transfer torque ΔT where the transfer torque ΔT is non-linearly increased according to the increase of the rotation speed difference ΔN. FIG. 10 shows a relationship between the clutch pressure $P_C$ and the transfer torque ΔT where the transfer torque ΔT is linearly increased according to the increase of the clutch pressure Pc. FIG. 11 shows a relationship between the duty ratio D and the clutch pressure Pc where the clutch pressure of the valve 122 is non-linearly increased according to the increase of the duty ratio D to form a parabolic curve.

The first microcomputer 207 determines the transfer torque ΔT from the front and rear rotation speed difference ΔN and the table corresponding to the characteristic curve shown in FIG. 9, and further determines the duty ratio D on the basis of the determined transfer torque ΔT and the tables corresponding to the characteristic curves shown in FIGS. 10 and 11. When the clutch pressure $P_C$ ranging from P1–P2 corresponding to a range of the duty ratio D within D1–D2 is supplied to the friction clutch 66, the friction clutch 66 is engaged so as to distribute the drive power with a torque distribution ratio from R.W.(rear wheel):F.W.(front wheel) =100%:0% to R.W.:F.W.=50%:50%. That is, the torque distribution ratio is continuously changed from 1:0 to 0.5:0.5 according to the change of the clutch pressure Pc.

Next, the operation of the transfer 22 and the vehicle traveling condition thereby according the range selection of the auxiliary transmission lever will be discussed hereinafter.

The auxiliary transmission lever can select a rear 2WD high-speed range (2H range), a 4WD high-speed range (4H range), a neutral range (N range) and a 4WD low-speed range (4L range). When the 4L range or 4H range is selected, the 2WD-4WD mode sensor 90 outputs a mode signal Dn indicative that the 4L range or 4H range is selected, to the control unit 18.

When the N range is selected, the shift sleeve 64b is slid to a neutral position N designated by a two-dots chain line in the upper portion of FIG. 5. In this case, the shift sleeve 64b is engaged with none of the high-speed shift gear 64c, the low-speed shift gear 64d and the 4WD gear 80, and therefore none of the front and rear wheels are driven.

When the 2H range is selected, the 2WD–4WD mode sensor 90 outputs the mode signal Dn indicative of the 2H range to the control unit 18. In reply to the mode signal indicative of the 2H range, the control unit 18 cancels the hydraulic pressure supply control and therefore no clutch pressure Pc is supplied to transfer 22. The shift sleeve 64b is slid to the high-speed position H as shown by a continuous line in an upper side of FIG. 5 so that the inner teeth 64b1 are engaged with the high-speed shift gear 64c. Accordingly, the drive power of the input shaft 42 is transferred through the high-speed shift gear 64c and the inner teeth 64b1 to the first output shaft 44 as a high-speed drive power. Since the friction plates 66b and the friction discs 66d of the friction clutch 66 are not engaged, the drive power is not transferred to the second output shaft 54. Therefore, the vehicle is driven in a high-speed 2WD condition.

When the 4H range is selected, the control unit 18 receives the mode signal Dn indicative of the 4WD mode from the 2WD–4WD mode sensor 90, and outputs a control signal $CS_0$ corresponding to a command value according to the duty ratio range $D_1$–$D_2$ to the solenoid 128d of the duty control electromagnetic valve 128 to control the clutch pressure control valve 122. According to the control signal $CS_0$ to the solenoid 128d, the clutch pressure control valve 122 outputs the secondary pressure ranging from $P_1$ to $P_2$ to the input port 74 through the pilot selector valve 126 as a clutch pressure Pc. The drive power of the input shaft 42 is transferred through the high-speed shift gear 64 and the inner teeth 64b1 to the first output shaft 44 as a high-speed drive power. The high-speed drive power of the first output shaft 44 is transferred as a high-speed drive power to the second output shaft 54 through the friction clutch 66 engaged to generate a predetermined torque distribution ratio, the first sprocket 68, the endless chain 72 and the second sprocket 70. Therefore, the vehicle is set to the high-speed 4WD condition.

When the 4L range is selected, the shift sleeve 64b is slid to the low-speed position L shown in a lower part of FIG. 4. In this case, the low-speed gear 64d is engaged with the outer teeth 46b2, and simultaneously the 4WD gear 80 is engaged with the inner teeth 64b1.

As the rotation speed of the low-speed shift gear 64d is reduced by the planetary gear mechanism 62 with respect to that of the input shaft 42, the drive power of the input shaft 42 is transferred as a reduced-speed drive power to the first output shaft 44 through the inner teeth 64b1, the 4WD drive gear 80, the first sprocket 68, the endless chain 72 and the second sprocket 70. Therefore, the vehicle can take the low-speed 4WD condition.

Next, the advantages gained by the lubricating device according to the present invention will be discussed hereinafter with reference to FIGS. 3 and 4.

By the rotation of the first output shaft 44, the second gear 136b of the main pump 100 is simultaneously rotated. The lubricating oil in the lubricating oil chamber 49 is stirred and splashed by the rotation of the second gear 136b and is flowed in the rotational direction of the second gear 136b. The oil level in the lubricating oil chamber 49 is raised by the returned lubricating oil from the oil gutter 53c. Further, the lubricating oil supplied to an inside space of the receiving member 47 is spirally flowed around the first output shaft 44 and is supplied to the bushing 45, as shown by the spiral line P in FIG. 3.

During the high-speed traveling of the vehicle, the lubricating oil in the lubricating oil chamber 49 receives a power due to the high-speed rotation of the second gear 136b and forcibly splashed. However, since the oil cover member 51 is formed around the second gear 136b so as to guide the splashed oil to the receiving member 47, the splashed oil is securely supplied to the bushing 45 through the receiving member 47. Accordingly, this simple lubricating structure of the power transfer system according to the present invention enables the lubricating oil to be securely supplied to the bushing 45 even in any rotational condition of the first output shaft 44. Further, since this oil cover member 51 is integrally formed with the rear casing 40c, the structural strength of the rear casing 40 is reinforced by the oil cover member 51.

While the invention has been shown and described with reference to preferred embodiment thereof, it will be understood by those skilled in the art that the foregoing and other changes in form and details can be made therein without departing from the spirit and scope of the invention.

What is claimed is:

1. A lubricating device for a power transfer system of a vehicle, said lubricating device lubricating a bushing at which an output shaft of the power transfer system is rotatably supported, said lubricating device comprising:

means defining an oil chamber for holding lubricating oil;

means for splashing the lubricating oil in said oil chamber;

means defining an oil passage extending to the bushing and around the output shaft for supplying the lubricating oil splashed by the lubricating oil splashing means; and means for guiding the splashed lubricating oil to said oil passage means so that the lubricating oil is spirally rotated around the output shaft and supplied to the bushing regardless of the output shaft rotational direction.

2. A lubricating system of a power transfer system as claimed in claim 1, wherein said oil chamber means includes a center casing and a rear casing for the power transfer system.

3. A lubricating system of a power transfer system as claimed in claim 1, wherein said splashed lubricating oil guiding means is integral with a rear casing of the power transfer system, and is formed to surround an upper portion of an outer periphery of said oil splashing means.

4. A lubricating device of a power transfer system as claimed in claim 1, wherein an oil level of the lubricating oil in said lubricating oil chamber means is oblique with respect to the axis of the output shaft such that the center axis of the output shaft is lowered toward a rear wheel of the vehicle.

5. A lubricating device for a power transfer system of a vehicle, comprising:

an output shaft rotatably supported by a bushing fixed to a housing of the power transfer system;

a lubricating oil chamber for holding lubricating oil formed by the housing;

a gear engaged with said output shaft, said gear being disposed in the vicinity of a bottom portion of said lubricating oil chamber and splashing the lubricating oil by its rotation;

an oil passage for supplying the lubricating oil splashed by the gear to the bushing; and an oil cover member formed around said gear so as to receive the lubricating oil splashed by said gear and to guide the lubricating oil to the oil passage so that the lubricating oil is spirally rotated around the output shaft and supplied to the bushing regardless of the output shaft rotational direction.

6. A lubricating device for a power transfer system of a vehicle, the power transfer system having an input shaft and an output shaft coaxially arranged in tandem, the output shaft being rotatably supported by a bushing installed to a housing, said lubricating device comprising:

an oil chamber formed by the housing and storing lubricating oil therein;

a gear engaged with said output shaft, said gear being disposed in the lubricating chamber and partly submerged in the lubricating oil, said gear splashing the lubricating oil by its rotation; and an oil cover member formed around said gear so as to receive the lubricating oil splashed by said gear and to guide the lubricating oil to the bushing so that the lubricating oil is spirally rotated around the output shaft and supplied to the bushing regardless of the output shaft rotational directional.

7. A lubricating device for a power transfer system of a vehicle, the lubricating device lubricating a bushing at which an output shaft of the power transfer system is rotatably supported, the lubricating device comprising:

means defining an oil chamber for holding lubricating oil;

means for splashing the lubricating oil in the oil chamber, the splashing means being engaged with the output shaft through a gear integral with the output shaft so that an axis of the splashing means is offset from that of the output shaft;

means defining an oil passage extending to the bushing and around the output shaft to supply the lubricating oil splashed by the lubricating oil splashing means to the bushing; and means for guiding the splashed lubricating oil to the oil passage means, the splashed lubricating oil guiding means being disposed to surround an outer periphery of the lubricating oil splashing means so as to guide the splashed lubricating oil to the oil passage means so that the lubricating oil is spirally rotated around the output shaft and supplied to the bushing regardless of the output shaft rotational direction.

8. A lubricating device for a power transfer system of a vehicle, comprising:

an output shaft rotatably supported by a bushing fixed to a housing of the power transfer system;

a lubricating oil chamber for holding lubricating oil formed by the housing;

a gear engaged with the output shaft so that an axis of the gear is offset downward of that of the output shaft, the gear being disposed in the vicinity of a bottom portion of the lubricating oil chamber and splashing lubricating oil by its rotation;

an oil passage for supplying the lubricating oil splashed by the gear to the bushing; and an oil cover member disposed to surround an outer periphery of the gear so as to receive the lubricating oil splashed by the gear and to guide the lubricating oil to the oil passage so that the lubricating oil is spirally rotated around the output shaft and supplied to the bushing regardless of the output shaft rotational direction.

9. A lubricating device for a power transfer system of a vehicle, the power transfer system having an input shaft and an output shaft coaxially arranged in tandem, the output shaft being rotatably supported by a bushing installed to a housing, the lubricating device comprising:

an oil chamber formed by the housing and storing lubricating oil therein;

a gear engaged with the output shaft so that an axis of the gear is offset downward of that of the output shaft, the gear being disposed in the lubricating chamber and partly submerged in the lubricating oil, the gear splashing the lubricating oil by its rotation; and an oil cover member disposed to surround an outer periphery of the gear to receive the lubricating oil splashed by the gear and to guide the lubricating oil to the bushing so that the lubricating oil is spirally rotated around the output shaft and supplied to the bushing regardless of the output shaft rotational direction.

* * * * *